US012136750B2

(12) United States Patent
Park

(10) Patent No.: US 12,136,750 B2
(45) Date of Patent: Nov. 5, 2024

(54) AIR-COOLED FUEL CELL

(71) Applicants: Hyundai Motor Company, Seoul (KR); Kia Corporation, Seoul (KR)

(72) Inventor: Jeong Hee Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 306 days.

(21) Appl. No.: 17/709,974

(22) Filed: Mar. 31, 2022

(65) Prior Publication Data

US 2022/0393190 A1     Dec. 8, 2022

(30) Foreign Application Priority Data

Jun. 8, 2021    (KR) .................. 10-2021-0074226

(51) Int. Cl.
*H01M 8/04014*     (2016.01)
*H01M 8/2485*     (2016.01)

(52) U.S. Cl.
CPC ..... *H01M 8/04014* (2013.01); *H01M 8/2485* (2013.01); *H01M 2250/20* (2013.01)

(58) Field of Classification Search
CPC ......... H01M 2250/20; H01M 8/04014; H01M 8/04768; H01M 8/2484; H01M 8/2485; Y02E 60/50
See application file for complete search history.

(56) References Cited

FOREIGN PATENT DOCUMENTS

JP      2003243013 A   *   8/2003

OTHER PUBLICATIONS

Machine translation JP2003243013A (Year: 2003).*

* cited by examiner

*Primary Examiner* — Victoria H Lynch
(74) *Attorney, Agent, or Firm* — SLATER MATSIL, LLP

(57) ABSTRACT

An embodiment air-cooled fuel cell includes a cell stack, an air inlet manifold configured to allow air to flow into the cell stack therethrough, an air outlet manifold configured to allow the air to flow out of the cell stack therethrough, and a manifold opening/closing controller disposed at the air inlet manifold or the air outlet manifold and configured to allow or interrupt inflow or outflow of the air based on an operation state of the cell stack.

18 Claims, 12 Drawing Sheets

AIR-COOLED FUEL CELL

CROSS-REFERENCE TO RELATED APPLICATIONS

This application claims the benefit of Korean Patent Application No. 10-2021-0074226, filed on Jun. 8, 2021, which application is hereby incorporated herein by reference.

TECHNICAL FIELD

Embodiments relate to an air-cooled fuel cell.

BACKGROUND

A fuel cell is a device that generates power using hydrogen and oxygen. A fuel cell has come into widespread use in a variety of apparatuses. For example, a fuel cell is used as a power source for various types of vehicles or aircraft such as drones, or is used to generate power in a power plant.

When a fuel cell is used for aircraft, various pails constituting the fuel cell need to be lightweight and compact in order to reduce the weight and size of the fuel cell.

SUMMARY

Accordingly, embodiments are directed to an air-cooled fuel cell that can substantially obviate one or more problems due to limitations and disadvantages of the related art.

An embodiment provides an air-cooled fuel cell that has high durability, is lightweight, and has a compact structure.

An air-cooled fuel cell according to an embodiment may include a cell stack, an air inlet manifold configured to allow air to flow into the cell stack therethrough, an air outlet manifold configured to allow air to flow out of the cell stack therethrough, and a manifold opening/closing controller disposed at at least one of the air inlet manifold or the air outlet manifold to allow or interrupt inflow or outflow of air depending on the operation state of the cell stack.

For example, the manifold opening/closing controller may include a first opening/closing controller disposed at the air inlet manifold and a second opening/closing controller disposed at the air outlet manifold.

For example, the first opening/closing controller may be integrated with the air inlet manifold, and the second opening/closing controller may be integrated with the air outlet manifold.

For example, each of the first opening/closing controller and the second opening/closing controller may include a driving unit configured to be rotated by a motor, a power transmission unit configured to transmit rotational force of the driving unit as power, and a valve seat configured to be moved upwards and downwards by the power transmitted from the power transmission unit to open or close the air inlet manifold or the air outlet manifold.

For example, the power transmission unit may include a worm fixed to a leading end of a rotation shaft of the motor so as to rotate together with the rotation shaft and a screw shaft configured to receive rotational force of the rotation shaft through the worm to move the valve seat upwards and downwards in the direction perpendicular to the rotation shaft.

For example, the screw shaft may include a worm gear meshing with the worm so as to rotate in a direction different from the direction of the worm and a shaft protruding and extending from the worm gear so as to be coupled to the valve seat, the shaft being configured to rotate together with the worm gear. The valve seat may include a valve rod, having a screw hole formed therein to allow the shaft to be inserted thereinto and threadedly engaged therewith, and a valve cover having therein the screw hole. When the shaft inserted into the screw hole rotates, the valve cover may move upwards and downwards together with the valve rod to open or close the air inlet manifold or the air outlet manifold.

For example, one of the inner circumferential surface of the valve rod and the outer circumferential surface of the shaft may have a screw thread formed thereon, and the other one of the inner circumferential surface of the valve rod and the outer circumferential surface of the shaft may have a screw groove formed therein.

For example, each of the first opening/closing controller and the second opening/closing controller may further include a bearing disposed around the outer circumferential surface of the shaft to assist in rotation of the shaft.

For example, the manifold opening/closing controller may further include a first flow passage, disposed between the first opening/closing controller and the air inlet manifold to form a first path through which air introduced into the air inlet manifold flows, and a second flow passage, disposed between the second opening/closing controller and the air outlet manifold to form a second path through which air discharged from the air outlet manifold flows.

For example, the first flow passage may include a first end portion having a first opening formed therein so as to be coupled to the air inlet manifold and to allow inflow of air therethrough, a second end portion having a second opening formed therein so as to be opened or closed by the valve cover, the second end portion being located opposite the first end portion, and a first side portion disposed between the first end portion and the second end portion to define the first path.

For example, the shortest distance between the first end portion and the second end portion may be longer than or equal to the distance that the valve rod moves upwards and downwards.

For example, the second opening may have a size smaller than the size of the first opening, and the size of the first opening may be larger than or equal to the size of the air inlet manifold.

For example, the second flow passage may include a third end portion having a third opening formed therein so as to be coupled to the air outlet manifold and to allow outflow of air therethrough, a fourth end portion having a fourth opening formed therein so as to be opened or closed by the valve cover, the fourth end portion being located opposite the third end portion, and a second side portion disposed between the third end portion and the fourth end portion to define the second path.

For example, the shortest distance between the third end portion and the fourth end portion may be longer than or equal to the distance that the valve rod moves upwards and downwards.

For example, the fourth opening may have a size smaller than the size of the third opening, and the size of the third opening may be larger than or equal to the size of the air outlet manifold.

For example, each of the first opening/closing controller and the second opening/closing controller may further include a frame supporting the bearing and the screw shaft.

For example, the material of at least one of the valve seat or the frame may include plastic.

For example, the frame may include a fifth end portion formed to allow the bearing to be disposed thereon, the fifth end portion having a through-hole formed therein to allow the shaft to pass therethrough.

For example, the frame may further include a third side portion formed to guide the valve cover to move upwards and downwards.

For example, the frame may further include a sixth end portion coupled to the second end portion or the fourth end portion, the sixth end portion being located opposite the fifth end portion. At least one of the fifth end portion, the sixth end portion, or the third side portion may have a plurality of through-holes formed therein to allow flow of air therethrough.

For example, the air-cooled fuel cell may further include a controller configured to generate a control signal, and the driving unit may rotate at a speed and in a direction determined in response to the control signal.

For example, the controller may check the level of constraint current applied to the motor, and may generate the control signal using the checked level.

For example, the controller may determine the constraint current using at least one of the specifications of the motor, frictional force between the valve rod and the shaft, or the amount of current that is required when the valve cover closes the air inlet manifold or the air outlet manifold.

For example, when operation of the cell stack starts, the controller may generate a control signal to control the driving unit so that the valve seat of each of the first and second opening/closing controllers opens a respective one of the air inlet manifold and the air outlet manifold at the same time.

For example, the air-cooled fuel cell may further include a fan configured to inject air into the cell stack or to discharge air from the cell stack. The first opening/closing controller may be disposed between the fan and the air inlet manifold, or the second opening/closing controller may be disposed between the fan and the air outlet manifold.

According to another embodiment, a method of controlling an air-cooled fuel cell may include checking whether to start or end operation of the cell stack, rotating the motor of the driving unit until the valve seat opens the air inlet manifold and the air outlet manifold when operation of the cell stack starts, and rotating the motor of the driving unit until the valve seat closes the air inlet manifold and the air outlet manifold when operation of the cell stack ends.

For example, when operation of the cell stack starts, the driving unit may be controlled so that the valve seat simultaneously opens the air inlet manifold and the air outlet manifold.

However, the embodiments are not limited to the above-mentioned embodiments, and other embodiments not mentioned herein will be clearly understood by those skilled in the art from the following description.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain principles of the invention. In the drawings.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under" the terms "under the element" as well as "on the element" may be included based on the element.

In addition, relational terms, such as "first," "second," "on/upper part/above," and "under/lower part/below," are used only to distinguish between one subject or element and another subject or element, without necessarily requiring or involving any physical or logical relationship or sequence between the subjects or elements.

Hereinafter, an air-cooled fuel cell and a method of controlling the same according to embodiments will be described with reference to the accompanying drawings. The air-cooled fuel cell and the method of controlling the same will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, according to another embodiment, the x-axis, the y-axis, and the z-axis may intersect each other obliquely. For convenience of description, the +x-axis direction or the −x-axis direction will be referred to as a "first direction," the +y-axis direction or the −y-axis direction will be referred to as a "second direction,"

and the +z-axis direction or the −z-axis direction will be referred to as a "third direction."

Figure 1:
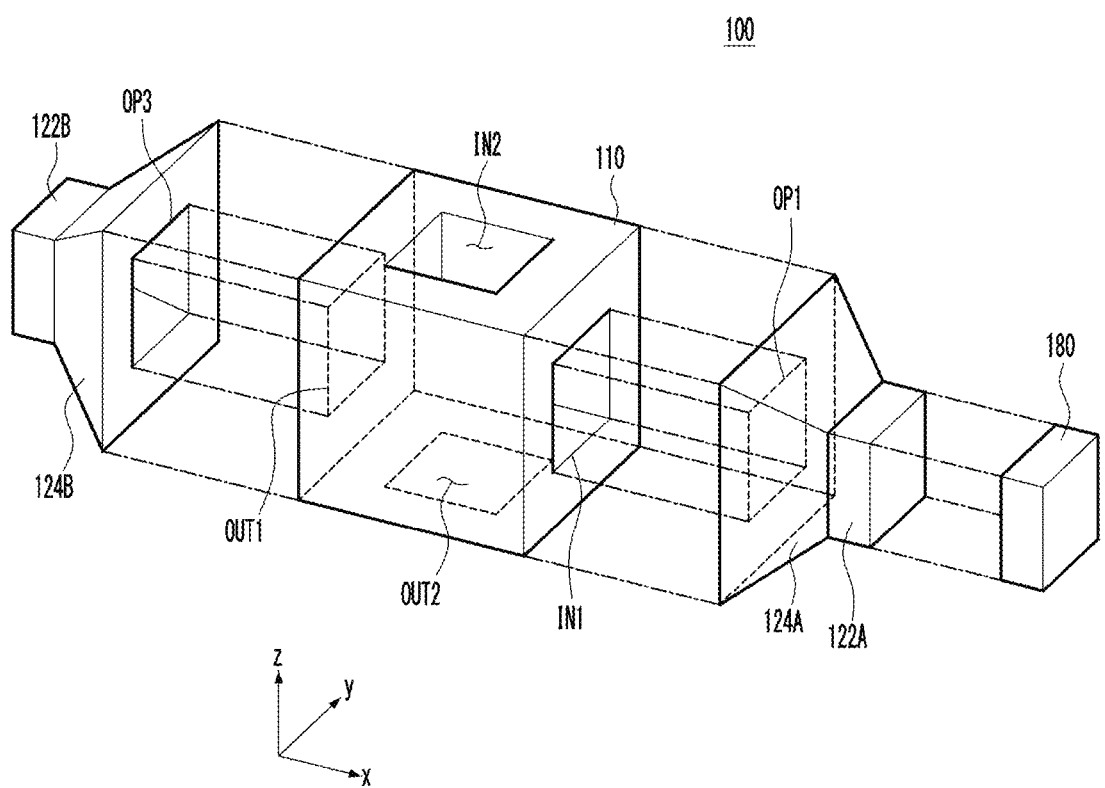
FIG. 1 is a perspective view of an air-cooled fuel cell according to an embodiment.
Figure 2:
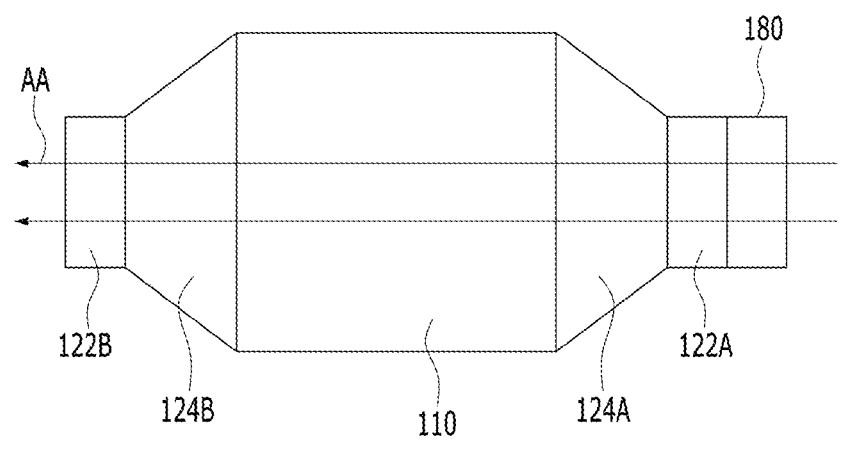
FIG. 2 is a front view of the air-cooled fuel cell shown in FIG. 1.
Figure 2:
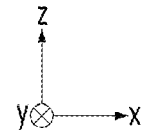

FIG. 1 is a perspective view of an air-cooled fuel cell 100 according to an embodiment, and FIG. 2 is a front view (or a cross-sectional view) of the air-cooled fuel cell shown in FIG. 1. Illustration of the manifolds IN1, IN2, OUT1, and OUT2 shown in FIG. 1 is omitted from FIG. 2.

The fuel cell 100 may be, for example, a polymer electrolyte membrane fuel cell (or a proton exchange membrane fuel cell) (PEMFC), but the embodiments are not limited to any specific type of fuel cell.

The fuel cell 100 may include a cell stack no, a first inlet communication portion (or a first inlet manifold) IN1, a first outlet communication portion (or a first outlet manifold) OUT1, a second inlet communication portion (or a second inlet manifold) IN2, a second outlet communication portion (or a second outlet manifold) OUT2, and a manifold opening/closing controller.

One of the first and second inlet communication portions IN1 and IN2 may be a hydrogen inlet hole through which hydrogen, which is a reactant gas supplied from the outside, flows into the cell stack no, and the other one thereof may be an oxygen inlet hole through which oxygen, which is a reactant gas supplied from the outside, flows into the cell stack no. One of the first and second outlet communication portions OUT1 and OUT2 may be an oxygen outlet hole through which oxygen, which is a reactant gas, and condensate water flow to the outside of the cell stack no, and the other one thereof may be a hydrogen outlet hole through which hydrogen, which is a reactant gas, and condensate water flow to the outside of the cell stack no.

The following description will be made on the assumption that the first inlet communication portion IN1 is an air inlet manifold for introducing air into the cell stack no, the first outlet communication portion OUT1 is an air outlet manifold for discharging air to the outside of the cell stack no, the second inlet communication portion IN2 is a hydrogen inlet manifold for introducing hydrogen into the cell stack no, and the second outlet communication portion OUT2 is a hydrogen outlet manifold for discharging hydrogen to the outside of the cell stack no. However, the following description may also apply to the case in which the first inlet communication portion IN1 is a hydrogen inlet manifold, the second inlet communication portion IN2 is an air inlet manifold, the first outlet communication portion OUT1 is a hydrogen outlet manifold, and the second outlet communication portion OUT2 is an air outlet manifold.

The cell stack no may include a plurality of unit cells stacked in the first or second direction. Here, the number of stacked unit cells may be determined depending on the intensity of the power to be supplied from the fuel cell 100 to a load. Here, "load" may refer to a part requiring power in an apparatus (e.g., a drone) in which the fuel cell is used.

Each unit cell may include a membrane electrode assembly (MEA). The membrane electrode assembly has a structure in which catalyst electrode layers, in which electrochemical reactions occur, are attached to both sides of an electrolyte membrane through which hydrogen ions move. Specifically, the membrane electrode assembly may include a polymer electrolyte membrane (or a proton exchange membrane), a fuel electrode (a hydrogen electrode or an anode), and an air electrode (an oxygen electrode or a cathode).

The polymer electrolyte membrane is disposed between the fuel electrode and the air electrode. Hydrogen, which is the fuel in the fuel cell 100, may be supplied to the fuel electrode, and air containing oxygen as an oxidizer may be supplied to the air electrode.

The hydrogen supplied to the fuel electrode is decomposed into hydrogen ions (protons) (H+) and electrons (e−) by the catalyst. The hydrogen ions alone may be selectively transferred to the air electrode through the polymer electrolyte membrane, and at the same time, the electrons may be transferred to the air electrode through another passage, rather than passing through the polymer electrolyte membrane. The movement of the electrons described above causes the electrons to flow through an external wire, thus generating current. In this way, the cell stack no generates power due to the electrochemical reaction between hydrogen, which is the fuel, and oxygen contained in the air.

In the air electrode, the hydrogen ions supplied through the polymer electrolyte membrane meet oxygen in the air supplied to the air electrode, thus causing a reaction that generates water (hereinafter referred to as "condensate water" or "product water"). In some cases, the fuel electrode may be referred to as an anode, and the air electrode may be referred to as a cathode. Alternatively, the fuel electrode may be referred to as a cathode, and the air electrode may be referred to as an anode.

Hereinafter, the manifold opening/closing controller of the fuel cell 100 according to an embodiment will be described with reference to the accompanying drawings. For better understanding of the embodiment, the manifold opening/closing controller will be described with reference to the fuel cell 100 having the configuration shown in FIGS. 1 and 2, but the embodiments are not limited thereto. In other words, the manifold opening/closing controller according to the embodiment may be implemented without being limited to the structure or type of the cell stack 110 or the positions or structures of the first and second inlet communication portions IN1 and IN2 and the first and second outlet communication portions OUT1 and OUT2.

The manifold opening/closing controller serves to allow or interrupt the inflow of air into the cell stack 110 or the outflow of air from the cell stack 110 depending on the state of operation of the cell stack 110. To this end, the manifold opening/closing controller may be disposed at at least one of the air inlet manifold IN1 or the air outlet manifold OUT1.

In one example, as shown in FIGS. 1 and 2, the manifold opening/closing controller may be disposed at each of the air inlet manifold IN1 and the air outlet manifold OUT1. As such, when the manifold opening/closing controller is disposed at each of the air inlet manifold IN1 and the air outlet manifold OUT1, the manifold opening/closing controller may more securely serve to allow or interrupt the inflow or outflow of air.

The manifold opening/closing controller may include first and second opening/closing controllers 122A and 122B.

The first opening/closing controller 122A may be disposed at the air inlet manifold IN1, and the second opening/closing controller 122B may be disposed at the air outlet manifold OUT1. According to the embodiment, the first opening/closing controller 122A may be formed integrally with the air inlet manifold IN1, and the second opening/closing controller 122B may be formed integrally with the air outlet manifold OUT1.

In addition, the manifold opening/closing controller may further include first and second flow passages 124A and 124B.

The first flow passage 124A may be disposed between the first opening/closing controller 122A and the air inlet manifold IN1 to form a path through which air introduced into the air inlet manifold IN1 flows (hereinafter referred to as a "first path"). In this case, the first opening/closing controller 122A, the first flow passage 124A, and the air inlet manifold IN1 may be integrally formed.

The second flow passage 124B may be disposed between the second opening/closing controller 122B and the air outlet manifold OUT1 to form a path through which air discharged from the air outlet manifold OUT1 flows (hereinafter referred to as a "second path"). In this case, the second opening/closing controller 122B, the second flow passage 124B, and the air outlet manifold OUT1 may be integrally formed.

The first opening/closing controller 122A and the first flow passage 124A have the same configurations as the second opening/closing controller 122B and the second flow passage 124B, respectively. Accordingly, the following description of the second opening/closing controller 122B and the second flow passage 124B may be applied to the first opening/closing controller 122A and the first flow passage 124A the description of which is omitted, and the following description of the first opening/closing controller 122A and the first flow passage 124A may be applied to the second opening/closing controller 122B and the second flow passage 124B the description of which is omitted.

Figure 3:
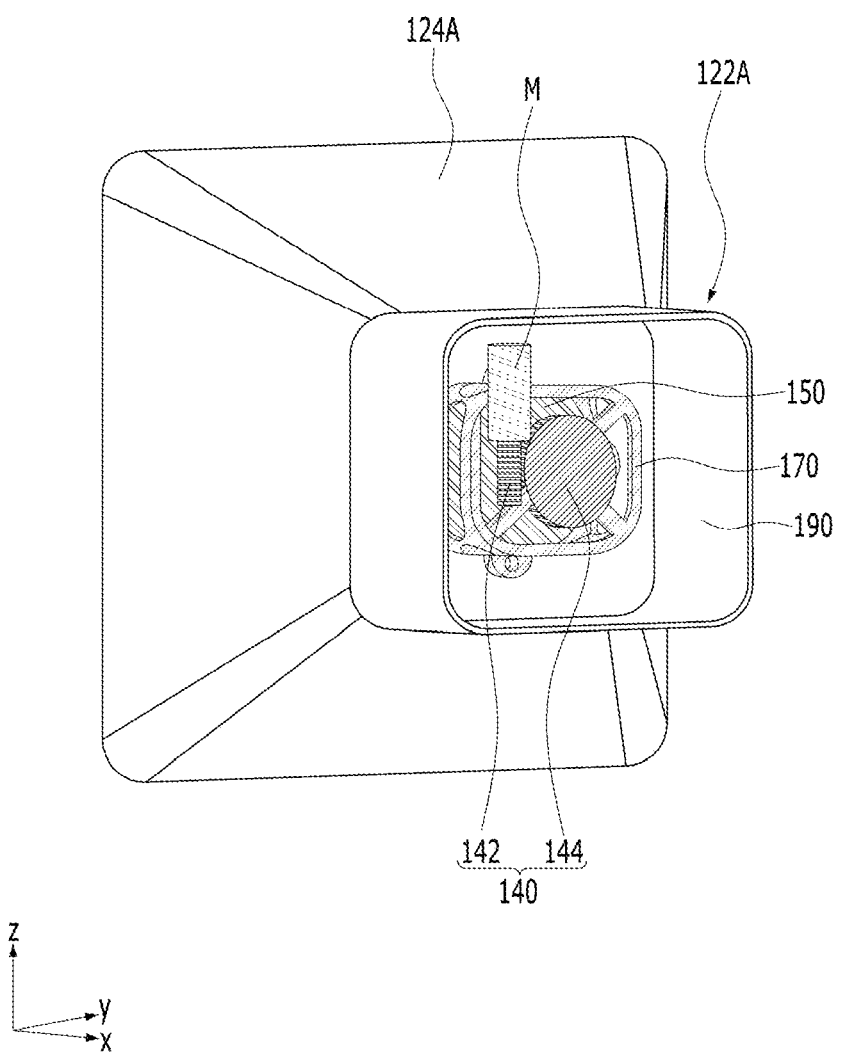
FIG. 3 is a perspective view of a first opening/closing controller and a first flow passage.
Figure 4:
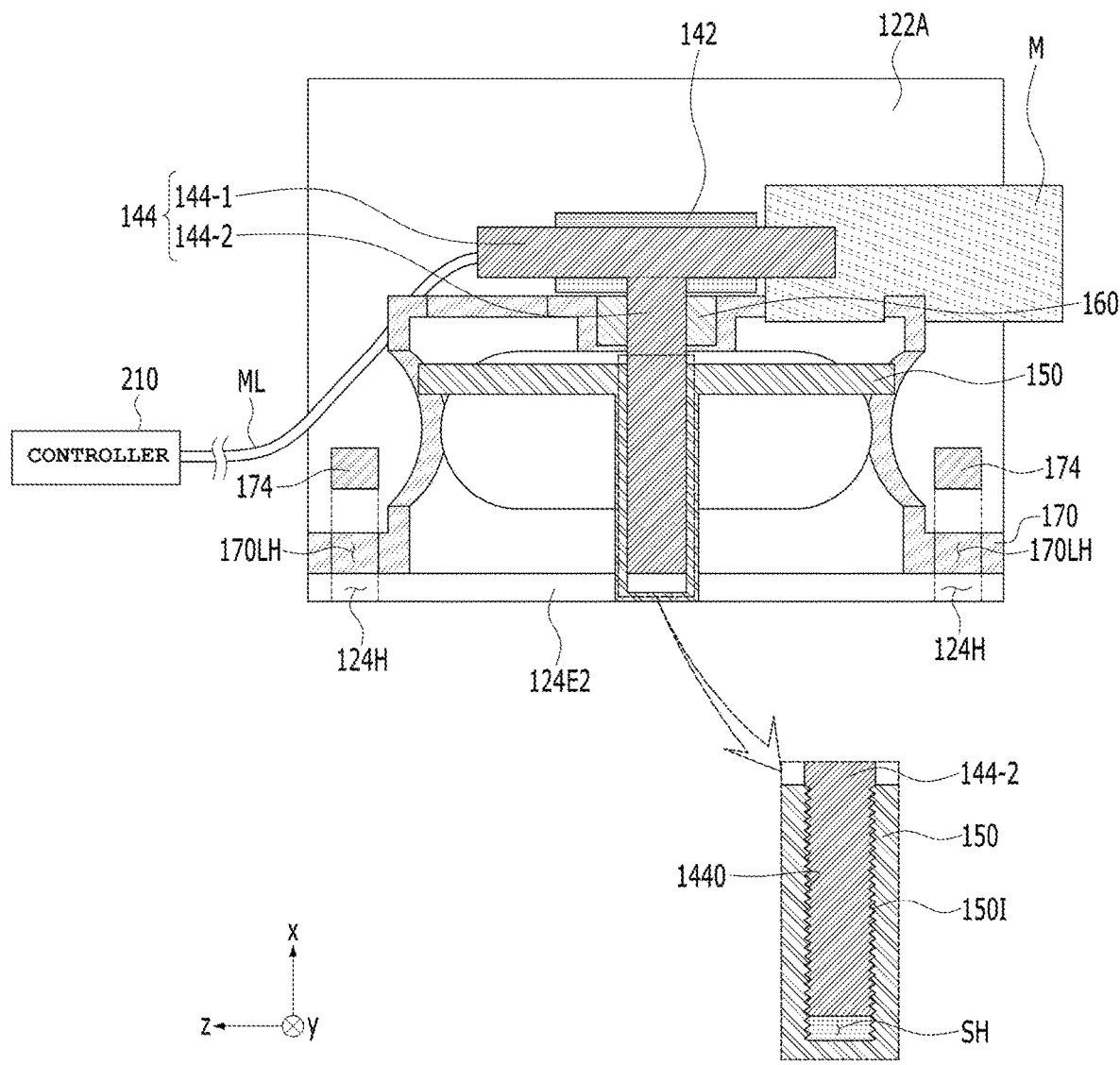
FIG. 4 is a cross-sectional view of the first opening/closing controller shown in FIG. 3.
Figure 5:
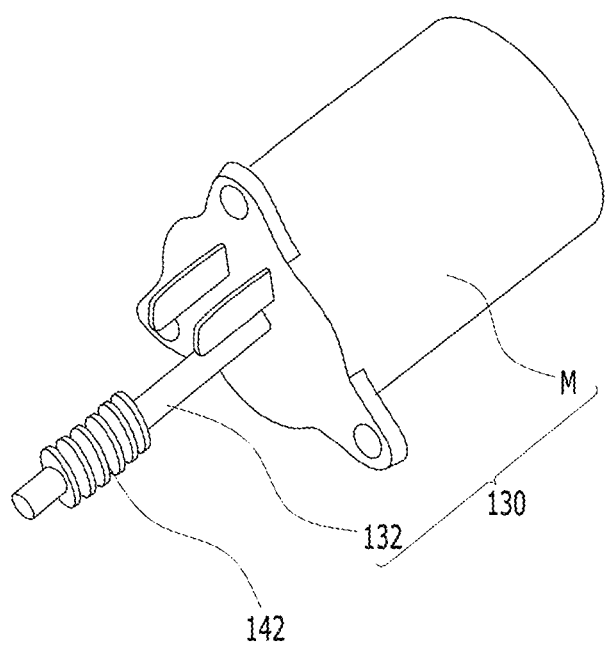
FIG. 5 is a partial perspective view of the first opening/closing controller shown in FIG. 3.

FIG. 3 is a perspective view of the first opening/closing controller 122A and the first flow passage 124A, FIG. 4 is a cross-sectional view of the first opening/closing controller 122A shown in FIG. 3, and FIG. 5 is a partial perspective view of the first opening/closing controller 122A shown in FIG. 3.

Each of the first and second opening/closing controllers 122A and 122B may include a driving unit 130, a power transmission unit 140, and a valve seat 150.

The driving unit 130 is rotated by a motor M. For example, as exemplarily shown in FIG. 5, the driving unit 130 may include a motor M and a rotation shaft 132. The motor M may rotate to generate torque when receiving electric power, and the rotational force of the motor M may be transmitted to the power transmission unit 140, which is connected to the rotation shaft 132.

The power transmission unit 140 may transmit the rotational force of the driving unit 130 as power for the valve seat 150. For example, the power transmission unit 140 may include a worm 142 and a screw shaft 144.

For example, as exemplarily shown in FIG. 5, the worm 142 may be fixed to the leading end of the rotation shaft 132 of the motor M, and may rotate together with the rotation shaft 132.

Figure 6:
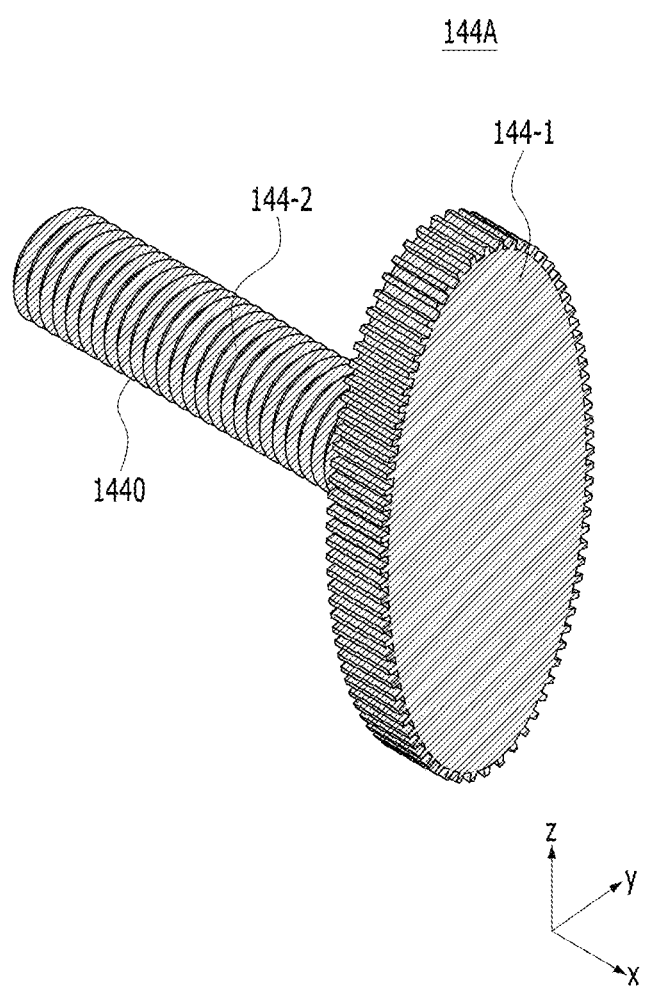
FIG. 6 is a perspective view of an embodiment of the screw shaft shown in FIGS. 4 and 5.

FIG. 6 is a perspective view of an embodiment 144A of the screw shaft 144 shown in FIGS. 4 and 5.

The screw shaft 144 serves to receive the rotational force of the rotation shaft 132 through the worm 142 and to move the valve seat 150 upwards and downwards in a direction perpendicular to the rotation shaft 132 (e.g., in the first direction). To this end, the screw shaft 144 may include a worm gear 144-1 and a shaft 144-2.

The worm gear 144-1 may mesh with the worm 142 to rotate in a direction different from the direction in which the worm 142 rotates. The shaft 144-2 may protrude and extend from the worm gear 144-1 so as to be coupled to the valve seat 150, and may rotate together with the worm gear 144-1 in the same direction as the worm gear 144-1.

In other words, the worm gear 144-1 may mesh with the worm 142 in order to transmit the torque of the motor M to the shaft 144-2. Because the worm 142 has structural characteristics that realize a very high torque ratio, the same may be easily applied to a system that requires high torque at a low rotational speed.

The valve seat 150 is moved upwards and downwards in the first direction by the power transmitted from the driving unit 130 through the power transmission unit 140, thereby opening or closing the air inlet manifold IN1 (or the air outlet manifold OUT1).

Figure 7:
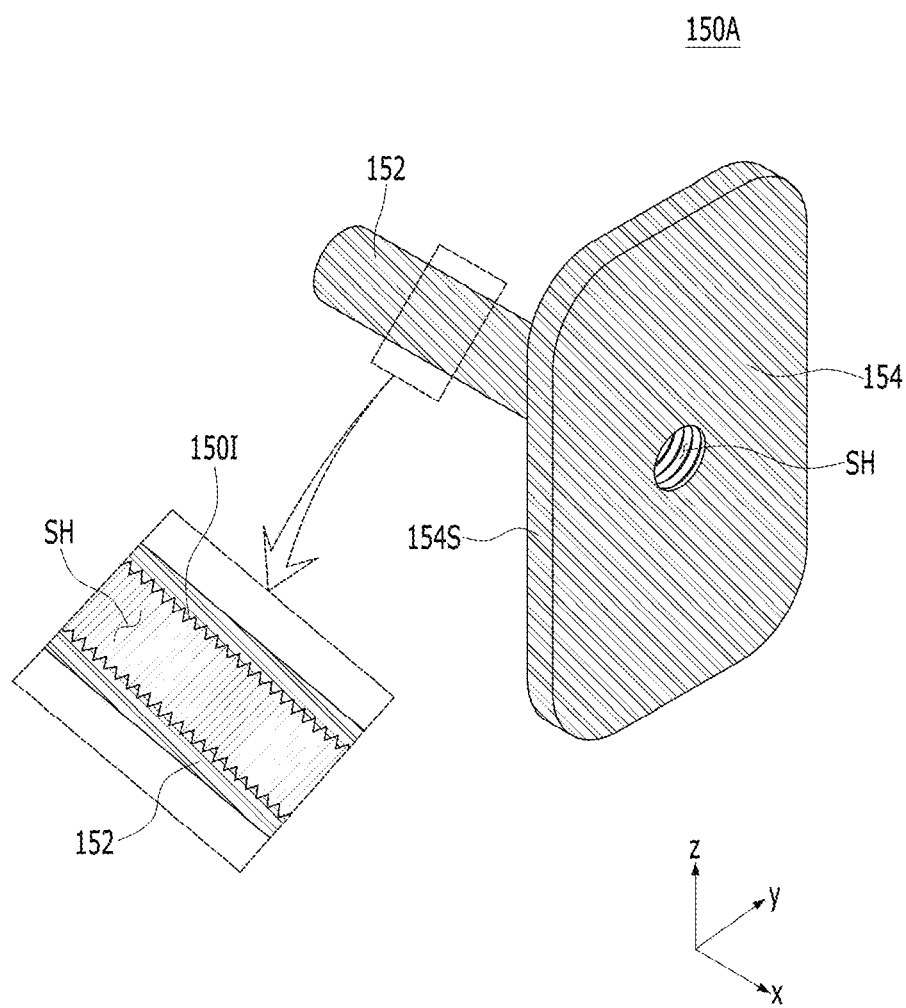
FIG. 7 is a perspective view of an embodiment of the valve seat shown in FIGS. 4 and 5.

FIG. 7 is a perspective view of an embodiment 150A of the valve seat 150 shown in FIGS. 4 and 5.

For example, the valve seat 150A may include a valve rod 152 and a valve cover 154.

A screw hole SH may be formed in the valve rod 152 and the valve cover 154 as a space so as to allow the shaft 144-2 to be inserted thereinto. The screw hole SH may be threadedly engaged with the shaft 144-2.

The valve cover 154 moves upwards and downwards together with the valve rod 152 in the first direction when the shaft 144-2 inserted into the screw hole SH rotates, thereby opening or closing the air inlet manifold IN1 (or the air outlet manifold OUT1).

According to the embodiment, in order to allow the valve seat 150 to linearly move upwards and downwards in conjunction with the rotational movement of the shaft 144-2, one of the screw hole SH, which is the inner circumferential surface 150I of the valve rod 152, and the outer circumferential surface 144O of the shaft 144-2 may have a screw thread formed thereon, and the other one of the screw hole SH, which is the inner circumferential surface 150I of the valve rod 152, and the outer circumferential surface 144O of the shaft 144-2 may have a screw groove formed therein. In one example, as shown in FIGS. 4 and 6, the outer circumferential surface 144O of the shaft 144-2 may have a screw thread formed thereon, and as shown in FIGS. 4 and 7, the screw hole SH, which is the inner circumferential surface 150I of the valve rod 152, may have a screw groove formed therein. Alternatively, contrary to what is illustrated, the outer circumferential surface 144O of the shaft 144-2 may have a screw groove formed therein, and the screw hole SH, which is the inner circumferential surface 150I of the valve rod 152, may have a screw thread formed thereon.

Figure 8:
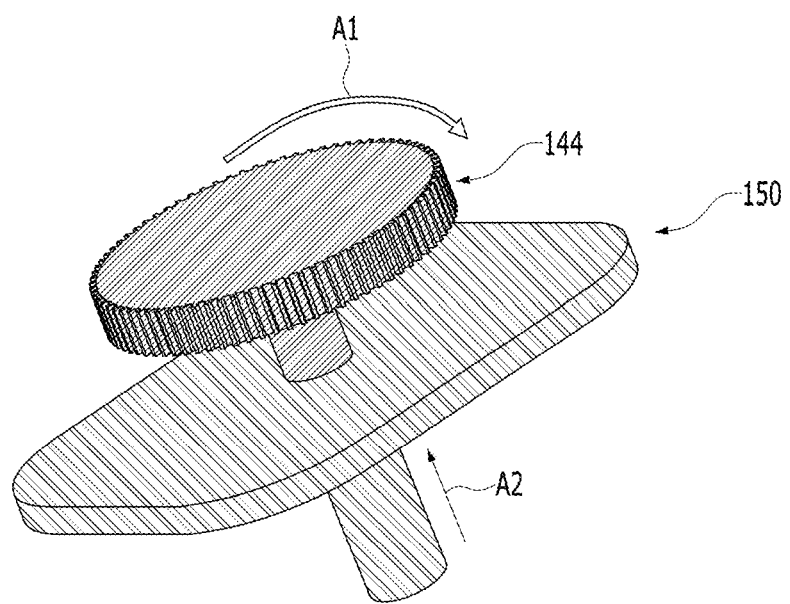
FIG. 8 is a perspective view showing the state in which the screw shaft is inserted into and engaged with a screw hole in the valve seat.

FIG. 8 is a perspective view showing the state in which the screw shaft 144 is inserted into and engaged with the screw hole SH in the valve seat 150.

Referring to FIG. 8, when the screw shaft 144 rotates in the direction of the arrow A1, the valve seat 150 may move upwards and downwards in the first direction indicated by the arrow A2. For example, when the screw shaft 144 rotates in the direction of the arrow A1, the valve seat 150 may move linearly in the direction indicated by the arrow A2, and when the screw shaft 144 rotates in the direction opposite the direction of the arrow A1, the valve seat 150 may move linearly in the direction opposite the direction indicated by the arrow A2. In order to realize the operation, the shaft 144-2 of the screw shaft 144 and the valve rod 152 may be threadedly engaged with each other, as shown in FIGS. 4 and 8 so that the valve seat 150 moves linearly in the first direction without rotating while the screw shaft 144 rotates as shown in FIG. 8. In the case in which the shaft 144-2 and the valve rod 152 are threadedly engaged with each other, when the supply of electric power to the motor M is interrupted, the positions of the shaft 144-2 and the valve rod 152 at that time may be maintained.

For example, the motor M may be a DC motor configured to be driven by DC voltage (e.g., 12 volts). In this case, the motor M may rotate in a forward direction or in a reverse direction depending on the direction of the current supplied to the motor M. Therefore, it is possible to determine whether to rotate the screw shaft 144 in the direction of the arrow A1 shown in FIG. 8 or in the direction opposite the direction of the arrow A1 by changing the direction of the current supplied to the motor M.

In addition, each of the first and second opening/closing controllers 122A and 122B according to the embodiment may further include a bearing 160. The bearing 160 is disposed around the outer circumferential surface 144O of the shaft 144-2, as shown in FIG. 4, and serves to assist in the rotation of the shaft 144-2. Because the manifold opening/closing controller is disposed in the space through which air flows, that is, because the inflow of air is interrupted or allowed by the valve cover 154, it may not be required to hermetically seal the bearing 160.

In addition, according to the embodiment, each of the first and second opening/closing controllers 122A and 122B may further include a frame 170.

The frame 170 may serve to support the bearing 160 and the screw shaft 144.

At least one of the valve seat 150 or the frame 170 may be made of a material lighter than metal, for example, plastic or an alloy containing magnesium, but the embodiments are not limited thereto. In the case in which at least one of the valve seat 150 or the frame 170 is made of a material lighter than metal, the fuel cell 150 according to the embodiment may be applied to a product requiring a lightweight fuel cell, such as an aerial drone.

Figure 9:
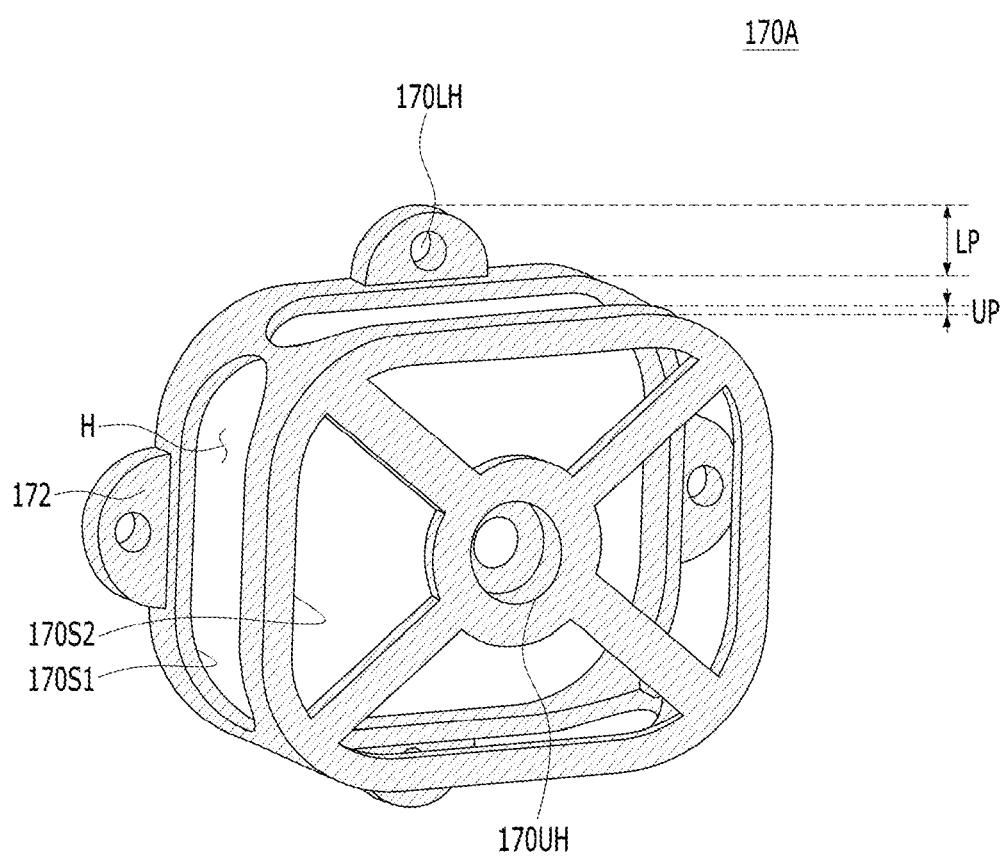
FIG. 9 is a perspective view of an embodiment of a frame.

FIG. 9 is a perspective view of an embodiment 170A of the frame 170.

Referring to FIGS. 4 and 9, the frame 170 (170A) may include an end portion UP on which the bearing 160 is disposed and in which a through-hole 170UH is formed to allow the shaft 144-2 to pass therethrough. For example, the through-hole 170UH may be formed in the end portion UP of the frame 170 (170A) so as to accommodate the bearing 160 and to define a path for allowing the shaft 144-2 to pass therethrough.

In addition, the frame 170A may also serve to guide the ascent and descent of the valve cover 154. To this end, the side portion of the frame 170A, which is located between the upper end portion UP and the lower end portion LP of the frame 170A, may include inner surfaces 170S1 and 170S2, which face the outer peripheral surface 154S of the valve cover 154, which ascends and descends in the first direction, in the state of being spaced apart therefrom. In other words, since the outer peripheral surface 154S of the valve cover 154 is spaced a predetermined gap apart from the inner surfaces 170S1 and 170S2 of the frame 170A, when the valve seat 150 ascends or descends, the frame 170A may guide the linear movement of the valve cover 154 in the first direction while preventing the valve cover 154 from shaking in at least one of the second direction or the third direction.

The fuel cell 100 according to the embodiment is configured as an air-cooled fuel cell in which heat is removed using air, rather than a water-cooled fuel cell in which heat is removed using coolant. For example, the air introduced into the air inlet manifold IN1 may remove heat from the cell stack 110, and may then flow to the outside through the air outlet manifold OUT1. To this end, the fuel cell 100 according to the embodiment may further include a fan 180. The fan 180 serves to inject air into the cell stack 110 or to discharge air from the cell stack 110.

In one example, the fan 180 may be disposed near the first inlet communication portion IN1, as shown in FIGS. 1 and 2. In this case, the first opening/closing controller 122A is disposed between the fan 180 and the air inlet manifold IN1.

Alternatively, the fan 180 may be disposed near the first outlet communication portion OUT1, unlike what is illustrated in FIGS. 1 and 2. In this case, the second opening/closing controller 122B may be disposed between the fan 180 and the air outlet manifold OUT1. However, the embodiments are not limited to any specific position at which the fan 180 is disposed.

In addition, each of the first and second opening/closing controllers 122A and 122B may further include a housing 190. Referring to FIGS. 3 and 4, the housing 190 serves to envelop at least portions of the driving unit 130, the power transmission unit 140, and the valve seat 150 to protect the same from the outside. The fan 180 shown in FIGS. 1 and 2 may be mounted to the housing 190.

Figure 10:
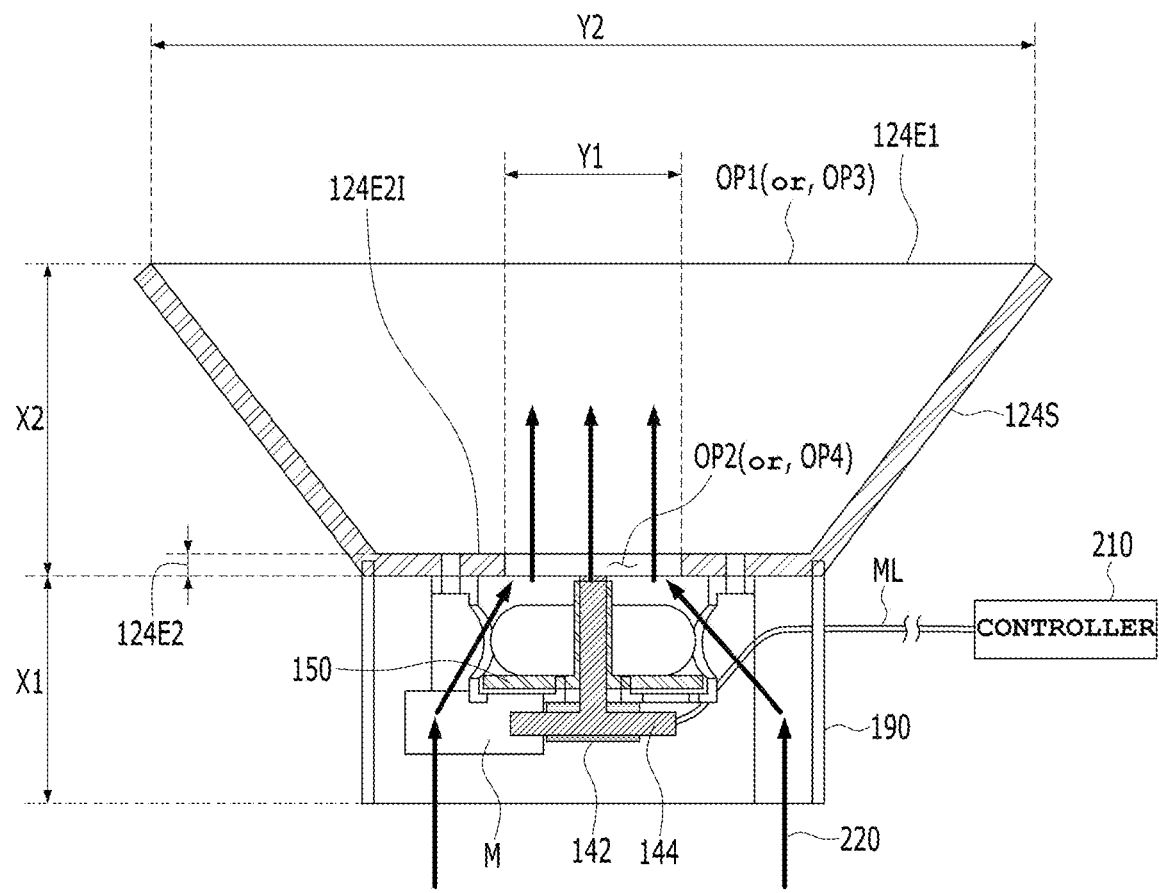
FIG. 10 is a cross-sectional view of the first opening/closing controller and the first flow passage shown in FIGS. 1 and 2 or a cross-sectional view of a second opening/closing controller and a second flow passage in a state in which air is allowed to flow into a cell stack.
Figure 11:
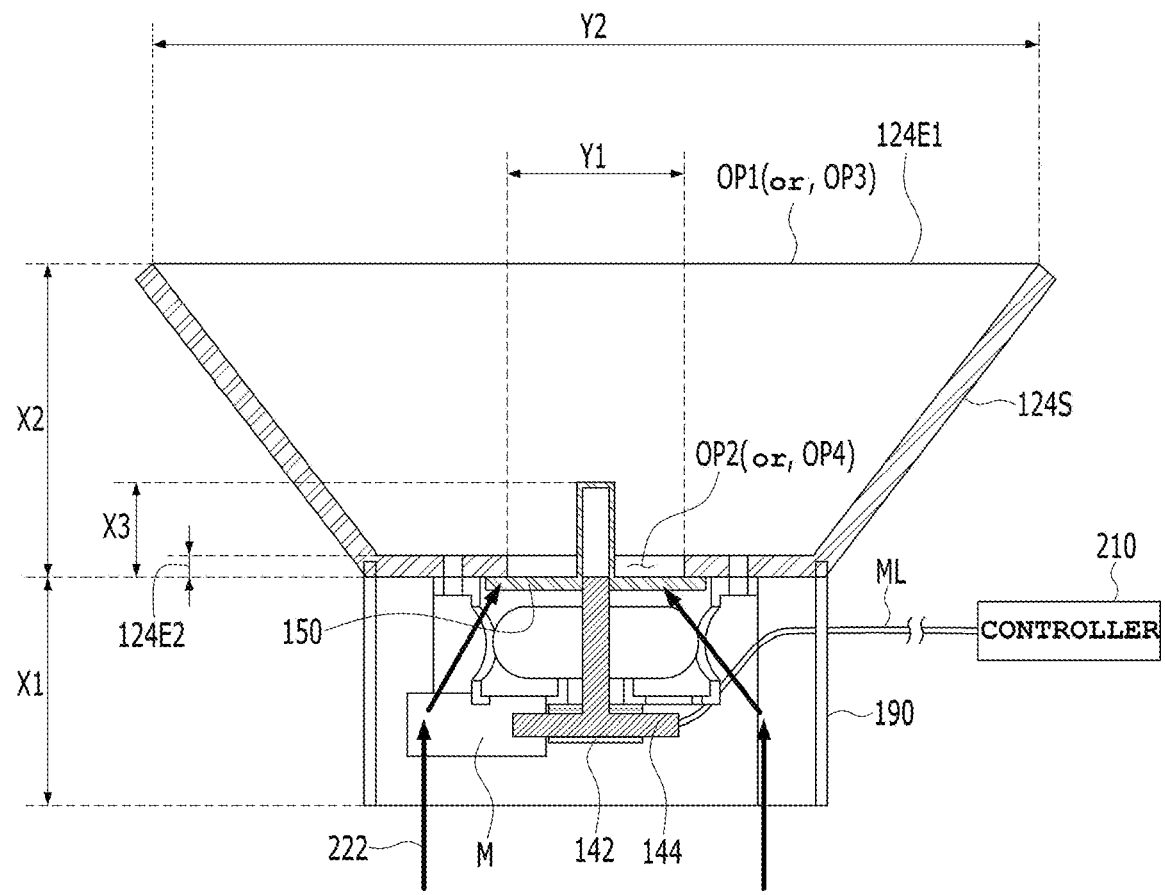
FIG. 11 is a cross-sectional view of the first opening/closing controller and the first flow passage shown in FIGS. 1 and 2 or a cross-sectional view of the second opening/closing controller and the second flow passage in a state in which the inflow of air into the cell stack is blocked.
Figure 11:
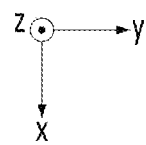

Each of FIGS. 10 and 11 is cross-sectional views of the first opening/closing controller 122A and the first flow passage 124A shown in FIGS. 1 and 2 or cross-sectional views of the second opening/closing controller 122B and the second flow passage 124B.

As shown in FIGS. 10 and 11, the first opening/closing controller 122A and the second opening/closing controller 122B may have the same configuration as each other, and the first flow passage 124A and the second flow passage 124B may have the same configuration as each other.

Each of the first and second opening/closing controllers 122A and 122B may have a first length X1 in the first direction.

The first flow passage 124A may include a first end portion 124E1, a second end portion 124E2, and a first side portion 124S.

The first end portion 124E1 may include therein a first opening OP1 that is coupled to the air inlet manifold IN1 and allows the inflow of air therethrough. The second end portion 124E2 includes therein a second opening OP2, and is located opposite the first end portion 124E1. The second opening OP2 may be opened or closed by the valve cover 154. The first side portion 124S may be disposed between the first end portion 124E1 and the second end portion 124E2 to define the first path.

The shortest distance X2 between the first end portion 124E1 and the second end portion 124E2 may be equal to or longer than the distance X3 that the valve rod 152 ascends and descends in the first direction (hereinafter referred to as an "ascending/descending distance"). Here, the ascending/descending distance is the maximum distance that the valve rod 152 moves from the inner side surface 124E2I of the second end portion 124E2 toward the first opening OP1 in order to close the second opening OP2.

If the shortest distance X2 is shorter than the ascending/descending distance X3, when the valve cover 154 of the valve seat 150, which is coupled to the screw shaft 144 as shown in FIG. 8, moves linearly in the first direction to close the second opening OP2, the valve cover 154 is not capable of completely closing the second opening OP2. In order to prevent this, the shortest distance X2 may be equal to or longer than the ascending/descending distance X3.

Further, the second opening OP2 may have a smaller size than the first opening OP1. For example, when the lengths of the first and second openings OP1 and OP2 in the third direction are equal to each other, the length Y1 of the second opening OP2 in the second direction may be shorter than the length Y2 of the first opening OP1 in the second direction.

Further, the size of the first opening OP1 may be greater than or equal to the size of the air inlet manifold IN1. For example, the size of the first opening OP1 shown in FIG. 1 may be equal to the size of the air inlet manifold IN1.

The second flow passage 124B has the same configuration as the first flow passage 124A. The second flow passage 124B may include a third end portion 124E1, a fourth end portion 124E2, and a second side portion 124S.

The third end portion 124E1 may include therein a third opening OP3 that is coupled to the air outlet manifold OUT1 and allows the outflow of air therethrough. The fourth end portion 124E2 includes therein a fourth opening OP4, and is located opposite the third end portion 124E1. The fourth opening OP4 may be opened or closed by the valve cover 154. The second side portion 124S may be disposed between the third end portion 124E1 and the fourth end portion 124E2 to define the second path.

The shortest distance X2 between the third end portion 124E1 and the fourth end portion 124E2 may be equal to or longer than the ascending/descending distance X3 that the valve rod 152 ascends and descends in the first direction. The reason for this is that, if the shortest distance X2 is shorter than the ascending/descending distance X3, when the valve cover 154 of the valve seat 150, which is coupled to the screw shaft 144 as shown in FIG. 8, moves linearly in the first direction to close the fourth opening OP4, the valve cover 154 is not capable of completely closing the fourth opening OP4.

Further, the fourth opening OP4 may have a smaller size than the third opening OP3. For example, when the lengths of the third and fourth openings OP3 and OP4 in the third direction are equal to each other, the length Y1 of the fourth opening OP4 in the second direction may be shorter than the length Y2 of the third opening OP3 in the second direction.

Further, the size of the third opening OP3 may be greater than or equal to the size of the air outlet manifold OUT1. For example, the size of the third opening OP3 shown in FIG. 1 may be equal to the size of the air outlet manifold OUT1.

Further, in a plane formed by the second and third directions (hereinafter referred to as a "first plane"), when the size of the first opening/closing controller 122A is formed to be smaller than the size of the air inlet manifold IN1, the volume and weight of the fuel cell 100 may be reduced, compared to when the size of the first opening/closing controller 122A is equal to the size of the air inlet manifold IN1. To this end, the first flow passage 124A is disposed between the first opening/closing controller 122A and the air inlet manifold IN1, whereby it is possible to make the size of the first opening/closing controller 122A smaller than the size of the air inlet manifold IN1 in the first plane.

Further, in the first plane, when the size of the second opening/closing controller 122B is formed to be smaller than the size of the air outlet manifold OUT1, the volume and weight of the fuel cell 100 may be reduced, compared to when the size of the second opening/closing controller 122B is equal to the size of the air outlet manifold OUT1. To this end, the second flow passage 124B is disposed between the second opening/closing controller 122B and the air outlet manifold OUT1, whereby it is possible to make the size of the second opening/closing controller 122B smaller than the size of the air outlet manifold OUT1 in the first plane.

Referring again to FIGS. 4, 9, 10, and 11, the frame 170 (170A) may include an end portion LP (hereinafter referred to as a "sixth end portion"), which is coupled to the second end portion OP2 (or the fourth end portion OP4) and is located opposite the end portion UP (hereinafter referred to as a "fifth end portion").

The frame 170 of the first opening/closing controller 122A and the first flow passage 124A may be coupled to each other in any of various forms, and the frame 170 of the second opening/closing controller 122B and the second flow passage 124B may be coupled to each other in any of various forms.

According to an embodiment, referring to FIG. 9, the sixth end portion LP of the frame 170 (170A) may include at least one protruding portion 172, which protrudes in a direction perpendicular to the second direction (e.g., in at least one of the first direction or the third direction), and the protruding portion 172 may include therein a first coupling recess 170LH. Further, referring to FIG. 4, the second end portion 124E2 of the first flow passage 124A may include therein a second coupling recess 124H, and the first opening/closing controller 122A may include a fastening member 174. In this case, the frame 170 (170A) may be coupled to the first flow passage 124A in a manner such that the fastening member 174 is inserted and fastened into the first and second coupling recesses 170LH and 124H.

Also, the frame 170 (170A) of the second opening/closing controller 122B and the second flow passage 124B are coupled to each other in the same manner as the manner in which the frame 170 (170A) of the first opening/closing controller 122A and the first flow passage 124A are coupled to each other, and thus a duplicate description thereof will be omitted.

Further, the frame 170 (170A) is disposed in each of the paths along which external air flows into the cell stack 110 through the air inlet manifold IN1 and along which the air in the cell stack 110 flows to the outside through the air outlet manifold OUT1. Therefore, the frame 170 (170A) needs to be formed so as not to impede the flow of air. To this end, at least one of the fifth end portion UP, the sixth end portion LP, or the side portion of the frame 170 (170A) may include therein a plurality of through-holes H to allow the flow of air therethrough. Preferably, empty spaces may be formed in the frame 170 (170A) to the greatest possible extent, except for the portions of the frame 170 (170A) that support or guide the components of each of the first and second opening/closing controllers 122A and 122B (e.g., the screw shaft 144 and the bearing 160). In other words, the frame 170 (170A) may include therein through-holes H that are as numerous or large as possible so that air may easily flow therethrough.

As described above, the rotational force generated by rotating the driving unit 130 including the motor M is supplied as power for the valve seat 150 through the power transmission unit 140, whereby the valve seat 150 is capable of moving upwards and downwards.

To this end, the driving unit 130 including the motor M may rotate at a speed and in a direction determined in response to a control signal. The control signal may be generated by a controller 210. The motor M may be connected to the controller 210 via an electric wire ML in order to be controlled by the controller 210. The controller 210 may directly supply electric power to the motor M to drive the same, or may control a power supply (not shown) using a control signal so that the power supply supplies electric power to the motor M.

For example, the controller 210 may check the level of the constraint current applied to the motor M, and may generate a control signal using the checked level. To this end, the controller 210 may determine the constraint current using at least one of the specification of the motor M, frictional force between the valve rod 152 and the shaft 144-2, or the amount of current that is required when the valve cover 154 closes the second opening OP2 in the air inlet manifold IN1 (or the fourth opening OP4 in the air outlet manifold OUT1).

Hereinafter, a method of controlling the fuel cell according to an embodiment will be described with reference to the accompanying drawings.

Figure 12:
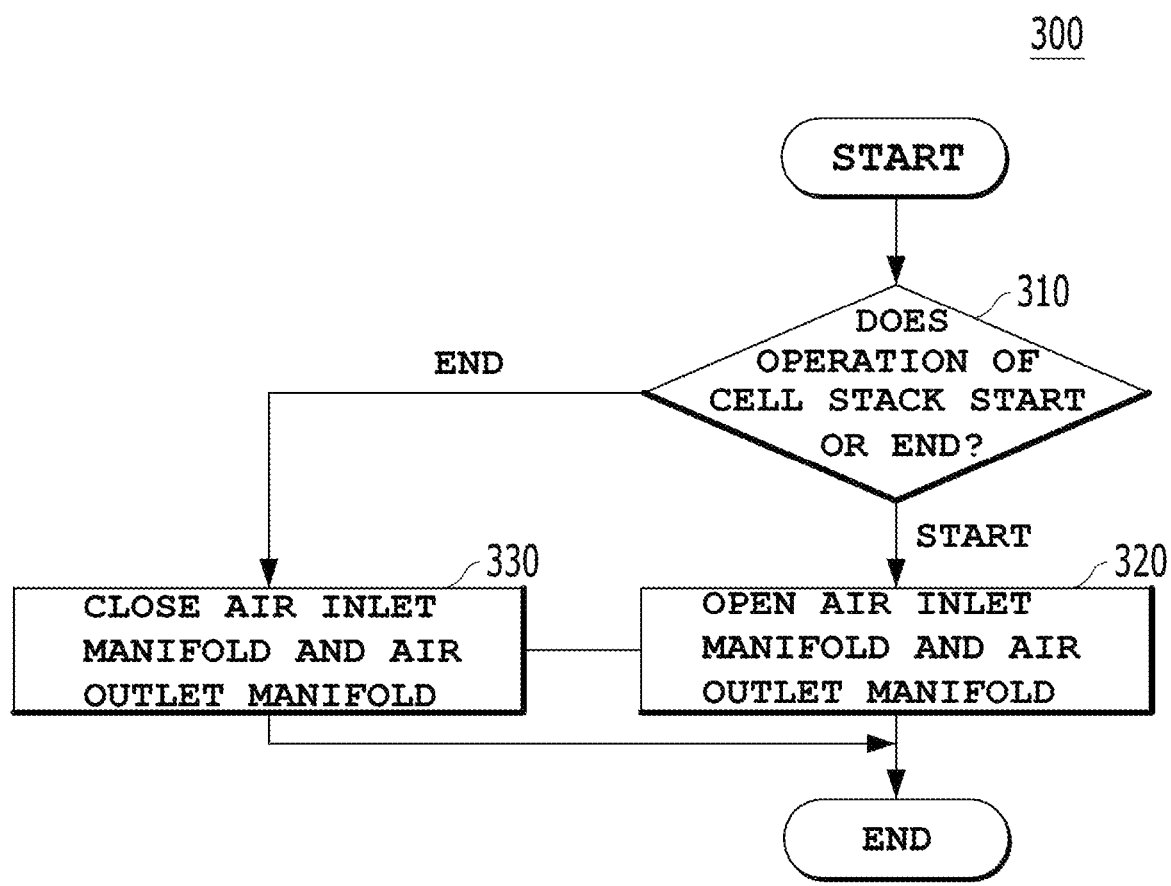
FIG. 12 is a flowchart of an air-cooled fuel cell control method according to an embodiment.

FIG. 12 is a flowchart of a fuel cell control method 300 according to an embodiment.

First, whether operation of the cell stack no starts or ends may be checked (step 310). Step 310 may be performed by the controller 210. In other words, the controller 210 may check whether operation of the cell stack no starts, that is, whether it is required to start operation of the cell stack 110. In addition, the controller 210 may check whether operation of the cell stack no ends, that is, whether it is required to end operation of the cell stack 110, or whether operation of the cell stack no has ended.

When operation of the cell stack no starts, the motor M of the driving unit 130 is rotated until the valve seat 150 opens the air inlet manifold IN1 and the air outlet manifold OUT1 (step 320).

For example, as shown in FIG. 11, in the state in which the valve cover 154 of the valve seat 150 covers the second opening OP2 in the air inlet manifold IN1 and the fourth opening OP4 in the air outlet manifold OUT1, the controller 210 checks whether it is required to start operation of the cell stack 110.

When it is required to start operation of the cell stack 110, the controller 210 generates a control signal to drive the motor M of the driving unit 130 so that the valve cover 154 opens the second opening OP2 in the air inlet manifold IN1 and the fourth opening OP4 in the air outlet manifold OUT1, as shown in FIG. 10. Specifically, when current is supplied to the motor M under the control of the controller 210, the rotational force of the motor M is transmitted to the worm 142, and the rotational force of the worm 142 is transmitted to the worm gear 144-1. When the worm gear 144-1 rotates, the valve rod 152 and the valve cover 154, which mesh with the screw shaft 144, move vertically from the state shown in FIG. 11 to the state shown in FIG. 10. Accordingly, the air inlet manifold IN1 is opened to form a path through which air flows into the cell stack no in the direction of the arrow 220, and the air outlet manifold OUT1 is opened to form a path through which air flows out of the cell stack no in the direction opposite the direction of the arrow 220. Thereafter, the supply of electric power to the motor M is interrupted.

At this time, according to the embodiment, when operation of the cell stack 110 starts, the controller 210 generates a control signal to control the driving unit 130 so that the valve cover 154 of the valve seat 150 of each of the first and second opening/closing controllers 122A and 122B opens a respective one of the air inlet manifold IN1 and the air outlet manifold OUT1 at the same time.

Alternatively, when operation of the cell stack no ends, the motor M of the driving unit 130 is rotated until the valve seat 150 closes the air inlet manifold IN1 and the air outlet manifold OUT1 (step 330).

For example, as shown in FIG. 10, in the state in which the valve cover 154 of the valve seat 150 opens the second opening OP2 in the air inlet manifold IN1 and the fourth opening OP4 in the air outlet manifold OUT1, whether it is required to end operation of the cell stack 110 or whether operation of the cell stack no has ended is checked.

When operation of the cell stack no ends, the controller 210 generates a control signal to drive the motor M of the driving unit 130 so that the valve cover 154 closes the second opening OP2 in the air inlet manifold IN1 and the fourth opening OP4 in the air outlet manifold OUT1, as shown in FIG. 11.

Specifically, when current is supplied to the motor M under the control of the controller 210, the rotational force of the motor M is transmitted to the worm 142, and the rotational force of the worm 142 is transmitted to the worm gear 144-1. When the worm gear 144-1 rotates, the valve rod 152 and the valve cover 154, which mesh with the shaft 144, move vertically from the state shown in FIG. 10 to the state shown in FIG. 11. Accordingly, the air inlet manifold IN1 is closed to block a path through which air flows into the cell stack no in the direction of the arrow 222, and the air outlet manifold OUT1 is closed to block a path through which air flows out of the cell stack no in the direction opposite the direction of the arrow 222. Thereafter, the supply of electric power to the motor M is interrupted.

For example, when the valve cover 154 closes the air inlet manifold IN1 and the air outlet manifold OUT1, the controller 210 checks whether the level of the constraint current supplied to the motor M is higher than or equal to a predetermined level. Upon determining that the level of the constraint current is higher than or equal to the predetermined level, the controller 210 determines that the air inlet manifold IN1 and the air outlet manifold OUT1 are completely closed by the valve cover 154, and interrupts the supply of electric power to the motor M.

As described above, when operation of the cell stack no starts, the controller 210 controls the driving unit 130, the power transmission unit 140, and the valve seat 150 so that the second opening OP2 and the fourth opening OP4 are opened at the same time. However, when operation of the cell stack no ends, it is not necessary to close the second opening OP2 and the fourth opening OP4 at the same time.

In the fuel cell 100, the screw shaft 144 and the valve seat 150 are operated only when operation of the cell stack no starts and ends. Accordingly, after the second and fourth openings OP2 and OP4 shown in FIG. 11 are opened as shown in FIG. 10, the supply of electric power to the motor M is interrupted, and after the second and fourth openings OP2 and OP4 shown in FIG. 10 are closed as shown in FIG. 11, the supply of electric power to the motor M is interrupted.

Also, the direction of the driving current applied to the motor M when operation of the cell stack no starts and the direction of the driving current applied to the motor M when operation of the cell stack no ends are different from each other.

Hereinafter, a comparison between a fuel cell according to a comparative example and the fuel cell according to an embodiment will be described.

In the case of an air-cooled fuel cell according to the comparative example, which uses air instead of coolant in order to remove heat, an air inlet manifold and an air outlet manifold are kept open, rather than being closed, after operation of a cell stack ends. For this reason, hydrogen and oxygen, which are reactant gases remaining in the cell stack, react, causing corrosion of a carbon support and deteriorating the durability of the cell stack.

In contrast, in the case of the air-cooled fuel cell 100 according to an embodiment, when operation of the cell stack no ends, the air inlet manifold IN1 and the air outlet manifold OUT1 are closed by the valve cover 154 using the manifold opening/closing controller, thereby blocking the inflow of air containing oxygen from the outside into the cell stack no and blocking the outflow of air containing oxygen from the cell stack no to the outside. As a result, the durability of the cell stack no may be approximately doubly improved compared to that of the comparative example.

Further, the components of the fuel cell 100 according to the embodiment described above are made of comparatively lightweight materials. For example, at least one of the valve seat 150 or the frame 170 (170A) may be made of plastic, which is lighter than metal, or an alloy containing magnesium. Accordingly, the fuel cell 100 according to the embodiment may be suitable for use in aircraft such as drones, which require lightweight and compact components.

Furthermore, in the fuel cell 100 according to the embodiment, it is possible to easily and securely open or close the air inlet manifold IN1 and the air outlet manifold OUT1 with a simple configuration using only the motor M, the screw shaft 144, and the valve seat 150. Accordingly, the fuel cell 100 according to the embodiment having a simple configuration may be more suitably used for aircraft such as drones.

Furthermore, the direction in which air flows is determined depending on the direction in which the fan 180 rotates. For example, when the fan 180 rotates in a first rotation direction, air flows in the direction of the arrow AA shown in FIG. 2, so "IN1" functions as the air inlet manifold, and "OUT1" functions as the air outlet manifold. On the other hand, when the fan 180 rotates in a second rotation direction, which is opposite the first rotation direction, air flows in the direction opposite the direction of the arrow AA shown in FIG. 2, so "IN1" functions as the air outlet manifold, and "OUT1" functions as the air inlet manifold.

In the fuel cell 100 according to the embodiment, the manifold opening/closing controller is disposed at each of the air inlet manifold IN1 and the air outlet manifold OUT1. Accordingly, when operation of the cell stack no ends, it is possible to reliably block the inflow and outflow of air into and out of the cell stack no irrespective of whether the fan 180 rotates in the first rotation direction or the second rotation direction, that is, irrespective of the direction in which air flows.

As is apparent from the above description, according to an air-cooled fuel cell and a method of controlling the same according to the embodiments, when operation of a cell stack ends, an air inlet manifold and an air outlet manifold are closed using a manifold opening/closing controller, thereby blocking the inflow of air containing oxygen from the outside into the cell stack and blocking the outflow of air containing oxygen from the cell stack to the outside, whereby the durability of the cell stack may be improved. In addition, the embodiments may be suitable for use in aircraft such as drones, which require lightweight and compact components. In addition, when operation of the cell stack ends, it is possible to reliably block the inflow and outflow of air into and out of the cell stack irrespective of the flow direction of air for cooling the fuel cell by the rotation of the fan, whereby the durability of the fuel cell may be improved.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. An air-cooled fuel cell comprising:
   a cell stack;
   an air inlet manifold configured to allow air to flow into the cell stack therethrough;
   an air outlet manifold configured to allow the air to flow out of the cell stack therethrough; and
   a manifold opening/closing controller disposed at the air inlet manifold or the air outlet manifold to allow or interrupt inflow or outflow of the air based on an operation state of the cell stack
   wherein the manifold opening/closing controller comprises:
      a first opening/closing controller disposed at the air inlet manifold; and
      a second opening/closing controller disposed at the air outlet manifold, and
   wherein each of the first opening/closing controller and the second opening/closing controller comprises:
      a driving unit configured to be rotated by a motor;
      a power transmission unit configured to transmit rotational force of the driving unit as power; and
      a valve seat configured to be moved upwards and downwards by the power transmitted from the power transmission unit to open or close the air inlet manifold or the air outlet manifold.

2. The air-cooled fuel cell according to claim 1, wherein:
   the first opening/closing controller is integrated with the air inlet manifold; and
   the second opening/closing controller is integrated with the air outlet manifold.

3. The air-cooled fuel cell according to claim 1, wherein the power transmission unit comprises:
   a worm fixed to a leading end of a rotation shaft of the motor so as to rotate together with the rotation shaft; and
   a screw shaft configured to receive rotational force of the rotation shaft through the worm to move the valve seat upwards and downwards in a direction perpendicular to the rotation shaft.

4. The air-cooled fuel cell according to claim 3, wherein:
   the screw shaft comprises:
      a worm gear meshing with the worm so as to rotate in a direction different from a direction of the worm; and
      a shaft protruding and extending from the worm gear so as to be coupled to the valve seat, the shaft being configured to rotate together with the worm gear;
   the valve seat comprises:
      a valve rod having a screw hole formed therein to allow the shaft to be inserted thereinto and threadedly engaged therewith; and
      a valve cover having therein the screw hole, wherein in response to rotation of the shaft that is inserted into the screw hole, the valve cover is configured to move upwards and downwards together with the valve rod to open or close the air inlet manifold or the air outlet manifold.

5. The air-cooled fuel cell according to claim 4, wherein:
one of an inner circumferential surface of the valve rod and an outer circumferential surface of the shaft has a screw thread formed thereon; and
a remaining one of the inner circumferential surface of the valve rod and the outer circumferential surface of the shaft has a screw groove formed therein.

6. The air-cooled fuel cell according to claim 4, wherein each of the first opening/closing controller and the second opening/closing controller further comprises a bearing disposed around an outer circumferential surface of the shaft to assist in the rotation of the shaft.

7. The air-cooled fuel cell according to claim 6, wherein the manifold opening/closing controller further comprises:
a first flow passage disposed between the first opening/closing controller and the air inlet manifold to form a first path through which the air introduced into the air inlet manifold flows; and
a second flow passage disposed between the second opening/closing controller and the air outlet manifold to form a second path through which the air discharged from the air outlet manifold flows.

8. The air-cooled fuel cell according to claim 7, wherein the first flow passage comprises:
a first end portion having a first opening formed therein so as to be coupled to the air inlet manifold and to allow inflow of air therethrough;
a second end portion having a second opening formed therein configured to be opened or closed by the valve cover, the second end portion being located opposite the first end portion; and
a first side portion disposed between the first end portion and the second end portion to define the first path.

9. The air-cooled fuel cell according to claim 8, wherein a shortest distance between the first end portion and the second end portion is longer than or equal to a distance that the valve rod moves upwards and downwards.

10. The air-cooled fuel cell according to claim 8, wherein:
the second opening has a size smaller than a size of the first opening; and
the size of the first opening is larger than or equal to a size of the air inlet manifold.

11. The air-cooled fuel cell according to claim 8, wherein the second flow passage comprises:
a third end portion having a third opening formed therein configured to be coupled to the air outlet manifold and to allow outflow of air therethrough;
a fourth end portion having a fourth opening formed therein configured to be opened or closed by the valve cover, the fourth end portion being located opposite the third end portion; and
a second side portion disposed between the third end portion and the fourth end portion to define the second path.

12. The air-cooled fuel cell according to claim 11, wherein a shortest distance between the third end portion and the fourth end portion is longer than or equal to a distance that the valve rod moves upwards and downwards.

13. The air-cooled fuel cell according to claim 11, wherein:
the fourth opening has a size smaller than a size of the third opening; and
the size of the third opening is larger than or equal to a size of the air outlet manifold.

14. The air-cooled fuel cell according to claim 11, wherein each of the first opening/closing controller and the second opening/closing controller further comprises a frame supporting the bearing and the screw shaft.

15. The air-cooled fuel cell according to claim 14, wherein the frame comprises a fifth end portion formed to allow the bearing to be disposed thereon, the fifth end portion having a through-hole formed therein to allow the shaft to pass therethrough.

16. The air-cooled fuel cell according to claim 15, wherein the frame further comprises a third side portion formed to guide the valve cover to move upwards and downwards.

17. The air-cooled fuel cell according to claim 16, wherein:
the frame further comprises a sixth end portion coupled to the second end portion or the fourth end portion, the sixth end portion being located opposite the fifth end portion; and
the fifth end portion, the sixth end portion, or the third side portion has a plurality of through-holes formed therein to allow flow of air therethrough.

18. The air-cooled fuel cell according to claim 1, further comprising:
a fan configured to inject air into the cell stack or to discharge air from the cell stack, wherein the first opening/closing controller is disposed between the fan and the air inlet manifold, or the second opening/closing controller is disposed between the fan and the air outlet manifold.

* * * * *